United States Patent [19]
Rickerby et al.

[11] Patent Number: 6,025,078
[45] Date of Patent: Feb. 15, 2000

[54] METALLIC ARTICLE HAVING A THERMAL BARRIER COATING AND A METHOD OF APPLICATION THEREOF

[75] Inventors: David S Rickerby; Paul Morrell, both of Derby, United Kingdom; Yuriy A Tamarin, Moscow, Russian Federation

[73] Assignee: Rolls-Royce PLC, London, United Kingdom

[21] Appl. No.: 08/911,375

[22] Filed: Aug. 7, 1997

[30] Foreign Application Priority Data

Aug. 16, 1996 [GB] United Kingdom ............... 9617267

[51] Int. Cl.$^7$ ................................ B32B 17/00
[52] U.S. Cl. .................. 428/469; 428/472; 428/698; 428/699; 428/701; 428/702; 427/453; 427/585; 427/419.2
[58] Field of Search ........................ 428/698, 699, 428/701, 702, 469, 472; 427/453, 585, 419.2

[56] References Cited

U.S. PATENT DOCUMENTS

| | | | |
|---|---|---|---|
| 4,055,705 | 10/1977 | Stecure | 428/633 |
| 5,652,044 | 7/1997 | Rickerby | 428/216 |

FOREIGN PATENT DOCUMENTS

| | | |
|---|---|---|
| A2-0 266 299 | 5/1988 | European Pat. Off. . |
| B1-0 628 090 | 12/1994 | European Pat. Off. . |
| 1 519 370 | 7/1978 | United Kingdom . |
| A-2 222 179 | 2/1990 | United Kingdom . |
| WO-A-93 18199 | 9/1993 | WIPO . |
| WO 94/08069 | 4/1994 | WIPO . |

*Primary Examiner*—Timothy M. Speer
*Attorney, Agent, or Firm*—Oliff & Berridge, PLC

[57] ABSTRACT

A metallic article (10) comprises a bond coating (14,16) on the metallic article (10) and a ceramic thermal barrier coating (18) on the bond coating (14,16). The ceramic thermal barrier (18) coating comprises zirconia stabilized with yttria, calcia, magnesia or india, and erbia to reduce the thermal conductivity of the ceramic thermal barrier coating (18). The ceramic thermal barrier coating (18) is at least 100 microns thick. The erbium atom has an atomic mass greater than the average atomic mass of the zirconium, the yttrium, calcium, magnesium or indium and the oxygen atoms to reduce phonon thermal conductivity of the ceramic thermal barrier coating (18). The ceramic thermal barrier coating (18) comprises 4 to 20 wt % of yttria, 5 to 25 wt % of erbia and the balance is zirconia plus incidental impurities. The erbia absorbs energy in the 0.3 microns to 5 microns waveband to reduce photon thermal conductivity. Other suitable additions besides erbia are dysprosia, europia, gadolinia, praseodymia, urania or ytterbia.

51 Claims, 3 Drawing Sheets

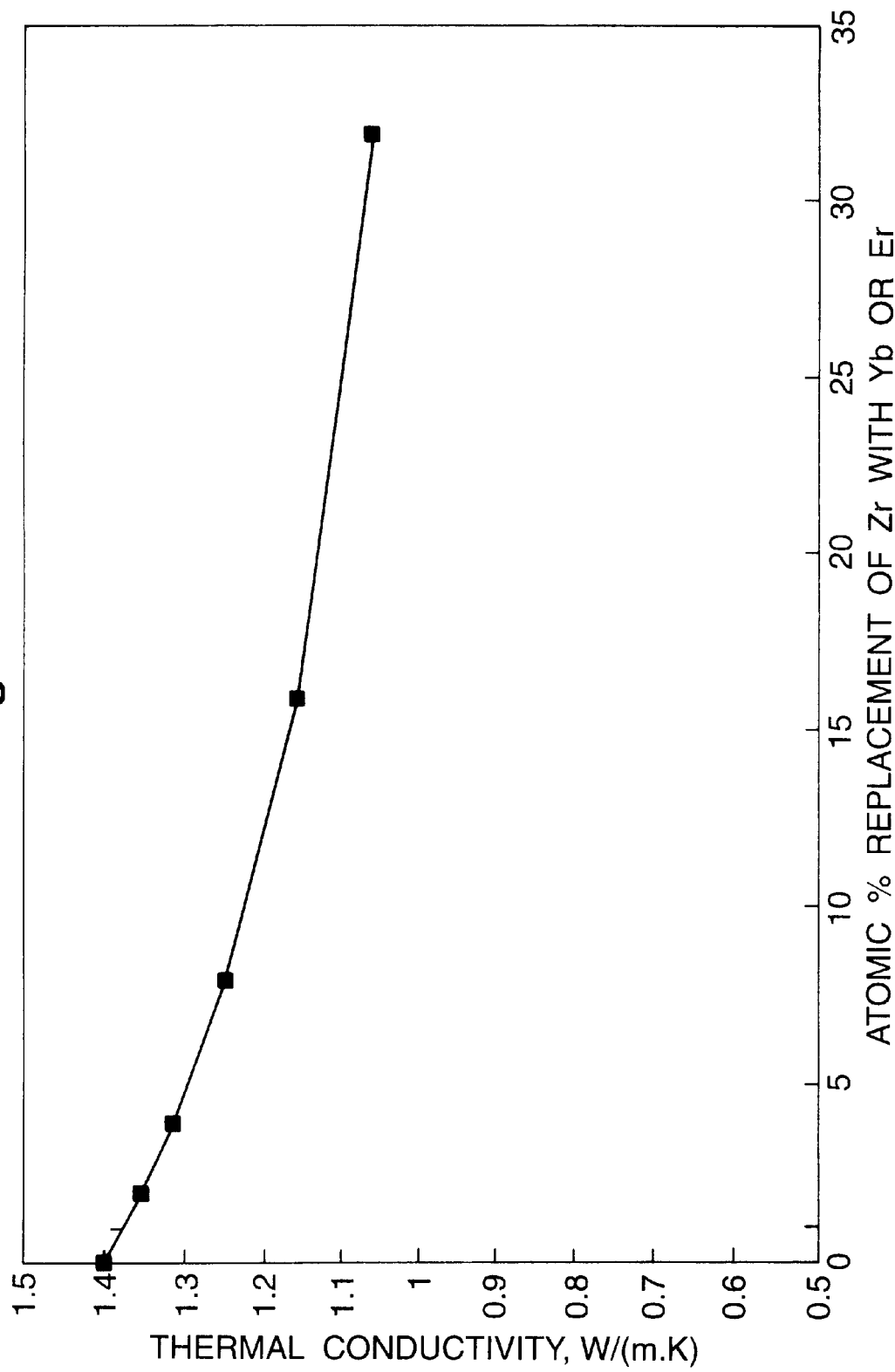

METALLIC ARTICLE HAVING A THERMAL BARRIER COATING AND A METHOD OF APPLICATION THEREOF

BACKGROUND OF THE INVENTION

The present invention relates to a thermal barrier coating applied to the surface of a superalloy article e.g. a gas turbine engine turbine blade, and to a method of applying the thermal barrier coating. The invention particularly relates to ceramic thermal barrier coatings more particularly to stabilized zirconia thermal barrier coatings.

The constant demand for increased operating temperature in gas turbine engines was initially met by air cooling of the turbine blades and the development of superalloys from which to manufacture the turbine blades and turbine vanes, both of which extended their service lives. Further temperature increases necessitated the development of ceramic coating materials with which to insulate the turbine blades and turbine vanes from the heat contained in the gases discharged from the combustion chambers, again the operating lives of the turbine blades and turbine vanes was extended.

It is known in the prior art to apply these ceramic coating materials by the thermal, or plasma, spray process onto a suitable bond coating, for example a MCrAlY alloy bond coating, which has been applied to the metallic substrate.

It is also known in the prior art to apply these ceramic coating materials by the physical vapour deposition process onto a suitable bond coating which has an alumina interface layer, for example a MCrAlY alloy bond coating, which has been applied to the metallic substrate.

It is also known in the prior art to apply these ceramic coating materials by plasma spraying or by physical vapour deposition processes onto an oxide layer on the metallic substrate.

The ceramic thermal barrier coatings deposited by the physical vapour deposition technique have benefits over the ceramic thermal barrier coatings deposited by plasma spraying. The main benefit is improved thermal shock resistance due to the columnar structure of the ceramic thermal barrier coating produced by the physical vapour deposition process. Other benefits are improved erosion resistance and improved aerothermal performance.

However, despite these advantages, the ceramic thermal barrier coating deposited by the physical vapour deposition technique exhibits a thermal conductivity which is greater than that of a ceramic thermal barrier coating, of the same or similar composition, deposited by the plasma spray process. For example the thermal conductivity of a zirconia-8 wt % yttria ceramic thermal barrier coating deposited by the PVD process is 2.0 W/m/K and the thermal barrier conductivity for the same ceramic thermal barrier coating deposited by the plasma spray process is 0.8–1.0 W/m/K. If all other factors are the same for the two methods of deposition of the ceramic thermal barrier coating, the greater conductivity of the ceramic thermal barrier coating deposited by the PVD process means that a greater thickness of ceramic is required to achieve the equivalent insulating effect when compared to the ceramic thermal barrier coating deposited by the plasma spray process. This is an undesirable property because this necessitates a greater weight of ceramic thermal barrier coating on the metallic components of the gas turbine engine, and this is particularly undesirable for rotating components, e.g. turbine blades, because the additional weight may limit the temperature of operation due to a corresponding reduction in creep life of the metallic turbine blade.

Our European patent EP0628090 discloses one method of reducing the thermal conductivity of a ceramic thermal barrier coating deposited by physical vapour deposition, in which layers are produced in the columnar grains by depositing alternately by pure physical vapour deposition and by plasma assisted physical vapour deposition. The layers in the columnar grains increase the resistance to heat transfer through the ceramic thermal barrier coating.

It is known from European patent EP0166097 to provide a ceramic thermal barrier coating of zirconia with a first metallic oxide, yttria, to stabilize the zirconia and a second metallic oxide, ceria, to reduce the thermal conductivity of the ceramic thermal barrier coating. The cerium ion has an ionic radius different to the ionic radius of the zirconium ion and hence reduces phonon thermal conductivity.

It is also know that the addition of a second metallic oxide to zirconia stabilized with a first metallic oxide, yttria, reduces the phonon thermal conductivity if the second metallic ion has a valency different to the zirconium ion because of the appearance of extra vacancies in the zirconia lattice.

SUMMARY OF THE INVENTION

The present invention seeks to provide a stabilized zirconia thermal barrier coating which has reduced thermal conductivity.

The present invention provides a metallic article comprising a bond coating on the metallic article and a ceramic thermal barrier coating on the bond coating, the ceramic thermal barrier coating comprising zirconia, a first suitable metallic oxide to stabilize the zirconia and a second metallic oxide to reduce the thermal conductivity of the ceramic thermal barrier coating, the metallic ion of the second metallic oxide has an ionic radius different to the ionic radius of the zirconium ion to reduce phonon thermal conductivity of the ceramic thermal barrier coating, the second metallic oxide absorbs energy in the 0.3 microns to 5 microns waveband to reduce photon thermal conductivity of the ceramic thermal barrier coating or the ceramic thermal barrier coating comprises a third metallic oxide which absorbs energy in the 0.3 microns to 5 microns waveband to reduce photon thermal conductivity of the ceramic thermal barrier coating.

Preferably the ceramic thermal barrier coating comprises 4 to 20 wt % of the first metallic oxide, 5 to 25 wt % of the second metallic oxide and the balance is zirconia plus incidental impurities.

Preferably the ceramic thermal barrier coating comprises 2 to 25 mol of the second metallic oxide.

Preferably the ceramic thermal barrier coating comprises 2 at % to 25 at % of the metallic ion of the second metallic oxide.

The second metallic oxide may be dysprosia, erbia, europia, gadolinia, neodymia, praseodymia, urania or ytterbia, if the third metallic oxide absorbs energy in the 0.3 microns to 5 microns waveband. The second metallic oxide may be erbia or neodymia if the second metallic oxide absorbs energy in the 0.3 microns to 5 microns waveband.

The first metallic oxide may be yttria, calcia, magnesia, india, scandia or ytterbia.

The bond coating may comprise a metal oxide, preferably alumina, layer on the metallic article.

The bond coating may comprise an aluminide, a platinum aluminide, an MCrAlY alloy or other aluminum containing alloy coating on the metallic article and a metallic oxide, preferably alumina, layer on the bond coating.

The bond coating may comprise an aluminum containing alloy coating on the metallic article, a platinum enriched aluminum containing alloy layer on the aluminum containing alloy coating, a platinum aluminide coating on the platinum enriched aluminum containing alloy layer and an alumina layer on the platinum aluminide coating.

The bond coating may comprise a platinum enriched outer layer on the metallic article and metallic oxide layer on the platinum enriched outer layer on the metallic article.

The metallic article may comprise a nickel superalloy or a cobalt superalloy.

The third metallic oxide may be nickel oxide, cobalt oxide or chromium oxide.

The present invention also provides a method of applying a thermal barrier coating to a metallic article, comprising the steps of: forming a bond coating on the metallic article, applying a ceramic thermal barrier coating to the bond coating, the ceramic thermal barrier coating comprising zirconia, a first metallic oxide to stabilize the zirconia and a second metallic oxide to reduce the thermal conductivity of the ceramic thermal barrier coating, the metallic ion of the second metallic oxide having an ionic radius different to the ionic radius of the zirconium ion to reduce phonon thermal conductivity of the ceramic thermal barrier coating, the second metallic oxide absorbs energy in the 0.3 microns to 5 microns waveband to reduce photon thermal conductivity of the ceramic thermal barrier coating or that the ceramic thermal barrier coating comprises a third metallic oxide which absorbs energy in the 0.3 microns to 5 microns waveband to reduce photon thermal conductivity of the ceramic thermal barrier coating.

BRIEF DESCRIPTION OF THE DRAWING

The present invention will be more fully described by way of example with reference to the accompanying drawings, in which:

FIG. 5 is a graph of thermal conductivity against atomic % of erbia or ytterbia.

DETAILED DESCRIPTION OF THE PREFERRED EMBODIMENTS

Figure 1:
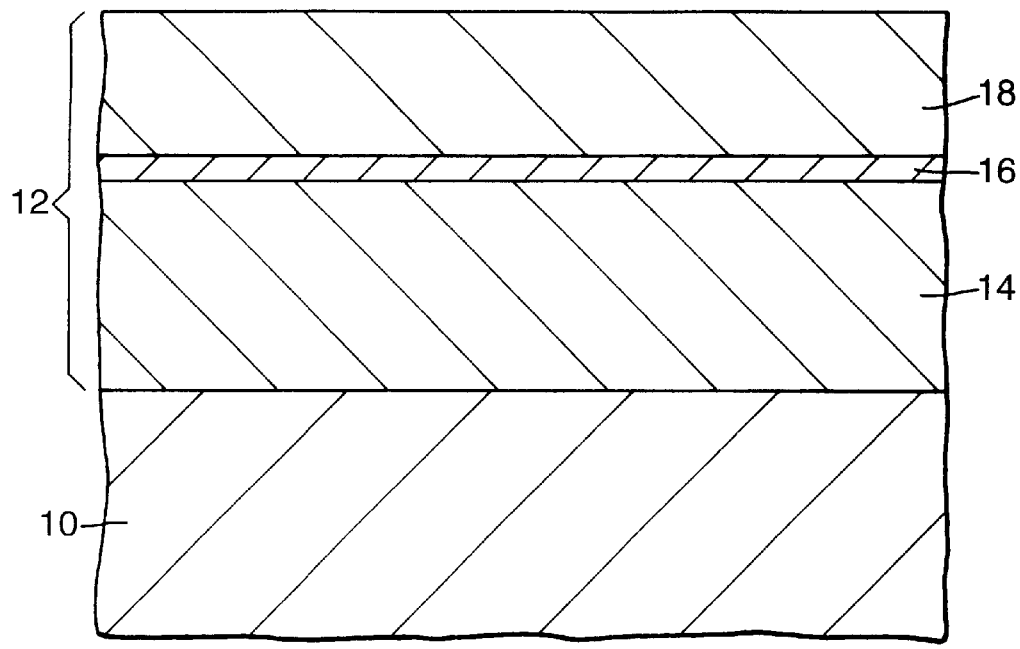
FIG. 1 is a cross-sectional diagrammatic view through a metallic article having a thermal barrier coating according to the present invention.

Referring to FIG. 1, illustrating the present invention there is shown part of a superalloy article 10 provided with a multi-layer thermal barrier coating indicated generally by numeral 12. It is shown in the as manufactured condition. The thermal barrier coating 12 comprises a bond coating 14 on the superalloy substrate 10, an oxide layer 16 on the bond coating 14 and a ceramic thermal barrier coating 18 on the oxide layer 16. The bond coating 14 is generally an aluminum containing alloy for example a MCrAlY alloy, a nickel aluminide, a cobalt aluminide or a platinum aluminide. The oxide generally contains alumina together with other oxides.

Figure 2:
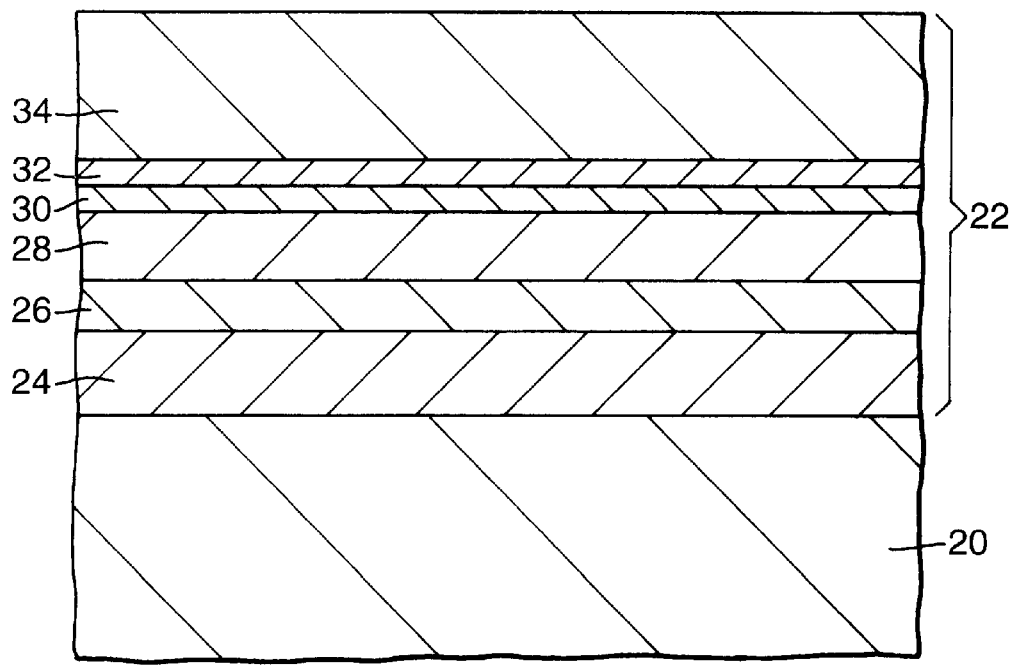
FIG. 2 is a cross-sectional diagrammatic view through a metallic article having another thermal barrier coating according to the present invention.

Another embodiment of the present invention is illustrated in FIG. 2 which shows part of a superalloy article 20 provided with a multi-layer thermal barrier coating indicated generally by numeral 22. It is shown in the as manufactured condition. The thermal barrier coating comprises a bond coating on the superalloy substrate 20, an oxide layer 32 on the bond coating and a ceramic thermal barrier coating 34 on the oxide layer 32. The bond coating comprises an aluminum containing alloy coating 24 on the metallic substrate 20, a platinum enriched aluminum containing alloy layer 26 on the aluminum containing alloy coating 24, a platinum aluminide coating 28 on the platinum enriched aluminum containing alloy layer 26 and a platinum enriched gamma phase layer 30 on the platinum aluminide coating 28. The oxide layer 32 is on the platinum enriched gamma phase layer 30. The oxide generally comprises very pure alumina.

Figure 3:
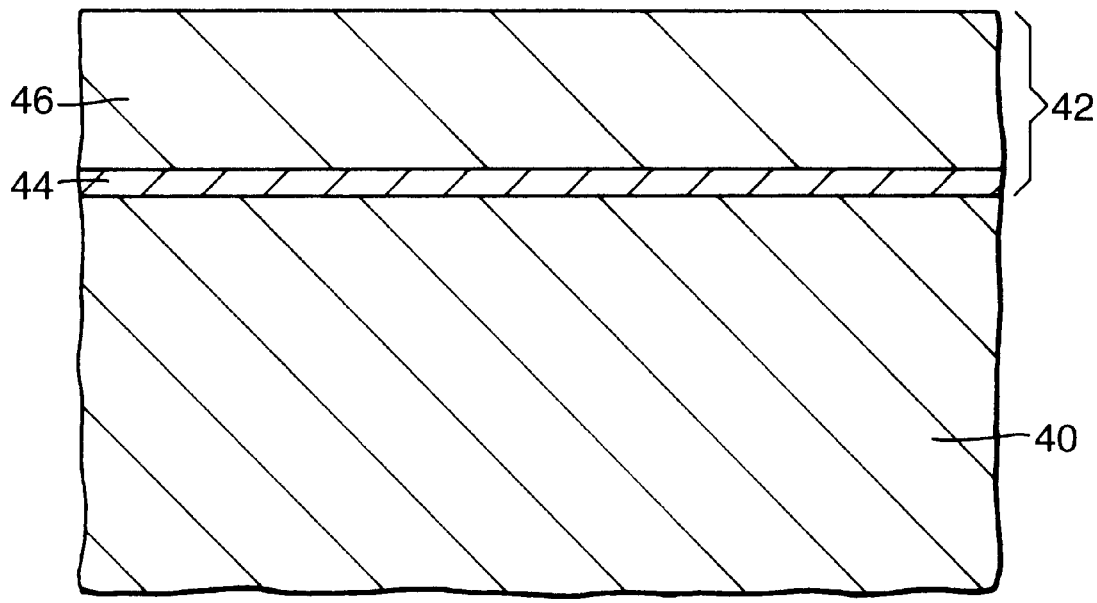
FIG. 3 is a cross-sectional diagrammatic view through a metallic article having a further thermal barrier coating according to the present invention.

A further embodiment of the present invention is illustrated in FIG. 3 which shows part of a superalloy article 40 provided with a multi-layer thermal barrier coating indicated generally by numeral 42. It is shown in the as manufactured condition. The thermal barrier coating comprises an oxide layer 44 on the superalloy article 40 and a ceramic thermal barrier coating 46 on the oxide layer 44.

Figure 4:
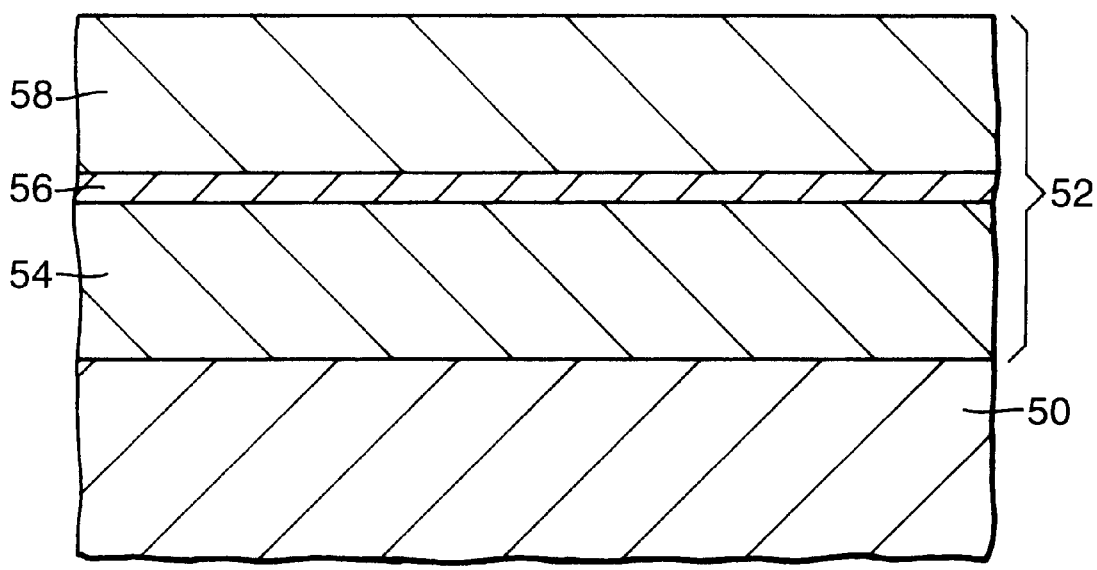
FIG. 4 is a cross-sectional diagrammatic view through a metallic article having a further thermal barrier coating according to the present invention.

Another embodiment of the present invention is illustrated in FIG. 4 which shows part of a superalloy article 50 provided with a multi-layer thermal barrier coating 52. It is shown in the as manufactured condition. The thermal barrier coating 52 comprises a bond coating 54 on the superalloy substrate 50, an oxide layer 56 on the bond coating 54 and a ceramic thermal barrier coating 58 on the oxide layer 56. The bond coating 54 comprises a platinum enriched outer layer on the superalloy substrate 50. The platinum enriched outer layer comprises a platinum enriched gamma prime phase in the platinum enriched gamma phase matrix. The platinum enriched gamma prime phase breaks down to the platinum enriched gamma phase to release aluminum to form alumina in the oxide layer 56.

A conventional ceramic thermal barrier coating comprises 4 to 20 wt % of one of yttria, ytterbia, ceria, india, scandia or magnesia and the remainder is zirconia plus incidental impurities. The yttria, ytterbia, ceria, india, scandia or magnesia is added to the zirconia to stabilize the zirconia in the tetragonal crystal structure.

The ceramic thermal barrier coatings shown in FIGS. 1, 2, 3 and 4 preferably comprises 4 to 20 wt % of one of yttria, ytterbia, ceria, india, scandia or magnesia, 4 to 25 mol %, or 5 to 25 wt %, of one of erbia or neodymia and the remainder is zirconia plus incidental impurities. This is equivalent to adding about 2 to 25 at % of the metallic ion of the erbia or neodymia. The erbia or neodymia is added to a conventional stabilized ceramic thermal barrier coatings in order to reduce the thermal conductivity of the ceramic thermal barrier coating.

Alternatively the ceramic thermal barrier coatings shown in FIGS. 1, 2, 3 and 4 comprises 4 to 20 wt % of one of yttria, ytterbia, ceria, india, scandia or magnesia, 4 to 25 mol %, or 5 to 25 wt %, of one of dysprosia, erbia, europia, gadolinia, neodymia, praseodymia, urania or ytterbia, one of nickel oxide, cobalt oxide or chromium oxide and the remainder is zirconia plus incidental impurities. This is equivalent to adding about 2 to 25 at % of the metallic ion of the dysprosia, erbia, europia, gadolinia, neodymia, praseodymia, urania or ytterbia. The dysprosia, erbia, europium, gadolinia neodymia, praseodymia, urania or ytterbia and the nickel oxide, cobalt oxide or chromium oxide are added to a conventional stabilized ceramic thermal barrier coatings in order to reduce the thermal conductivity of the ceramic thermal barrier coating.

Referring to FIG. 5, which shows the theoretical thermal conductivity of yttria stabilized zirconia with varying amounts of replacement of zirconium with erbium or ytterbium in atomic %, it is seen that as the atomic % of erbium or ytterbium increases from 0 atomic % to 30 atomic % the theoretical thermal conductivity of the ceramic thermal barrier coating reduces from 1.4 W/mK to 1.1 W/mK. Thus a 2 at % replacement of zirconium with erbium would reduce thermal conductivity of the ceramic thermal barrier coating by 3.5%, a 4 at % replacement of zirconium with erbium would reduce thermal conductivity of the ceramic thermal barrier coating by 7%, a 8 at % replacement of zirconium with erbium would reduce thermal conductivity of the ceramic thermal barrier coating by 10%, a 15 at % replacement of zirconium with erbium would reduce thermal conductivity of the ceramic thermal barrier coating by 18% and a 32 at % replacement of zirconium with erbium would reduce thermal conductivity of the ceramic thermal barrier coating by 21%.

In a series of experiments nickel superalloy articles were coated with a MCrAlY bond coating by plasma spraying or by electron beam physical vapour deposition, and a ceramic thermal barrier coating was deposited by electron beam physical vapour deposition onto the MCrAlY bond coats to produce an oxide interlayer therebetween.

The compositions of the source of the ceramic thermal barrier coating was varied and the thickness of the thermal barrier coating was varied to see the effect of the variation of the composition of the ceramic thermal barrier coating. The composition of the source of the ceramic thermal barrier coating was varied by drilling a hole in a zirconia, 8 wt % yttria source cylinder and by filling the hole with known amounts of erbia or ytterbia up to 25 wt %, about 10 mol %. The ceramic thermal barrier coatings were deposited at a rate of 3 microns per minute and thicknesses up to 550 microns were deposited.

EXAMPLE 1

A ceramic thermal barrier coating comprising 56.4 wt % Zr, 19.1 wt % O, 4.7 wt % Y and 19.8 wt % Er, equivalent to 31.2 at % Zr, 60.2 at % O, 2.7 at % Y and 6.0 at % Er, was deposited onto the MCrAlY bond coating. The ceramic thermal barrier coating comprises 71 wt % zirconia, 6 wt % yttria and 23 wt % erbia, which is equivalent to 87.8 mol % zirconia, 3.8 mol % yttria and 8.4 mol % erbia. The ceramic thermal barrier coating was deposited to a thickness of 540 microns. The thermal conductivity of the ceramic thermal barrier coating was measured during a heating and a cooling cycle to 1200° C. and had a thermal conductivity of 1.56 W/mK during heating and 1.75 W/mK during cooling. The ceramic thermal barrier coating has a cubic structure.

EXAMPLE 2

A ceramic thermal barrier coating comprising 57.5 wt % Zr, 18.4 wt % O, 4.7 wt % Y and 19.4 wt % Er, equivalent to 32.3 at % Zr, 59.0 at % O, 2.7 at % Y and 6.0 at % Er, was deposited onto the MCrAlY bond coating. The ceramic thermal barrier coating comprises 72 wt % zirconia, 6 wt % yttria and 22 wt % erbia, which is equivalent to 88.1 mols zirconia, 3.7 mol % yttria and 8.2 mol % erbia. The ceramic thermal barrier coating was deposited to a thickness of 76 microns. The thermal conductivity of the ceramic thermal barrier coating was measured during a heating and a cooling cycle to 1200° C. and had a thermal conductivity of 0.92 W/mK during heating and 0.98 W/mK during cooling.

The ceramic thermal barrier coating has a cubic structure.

EXAMPLE 3

A ceramic thermal barrier coating comprising 61.2 wt % Zr, 20.4 wt % O, 4.8 wt % Y and 13.7 wt % Yb, equivalent to 32.3 at % Zr, 61.3 at % O, 2.6 at % Y and 3.8 at % Yb, was deposited onto the MCrAlY bond coating. The ceramic thermal barrier coating comprises 78 wt % zirconia, 6 wt % yttria and 16 wt % ytterbia, which is equivalent to 91.0 mol % zirconia, 3.7 mol % yttria and 5.4 mol % ytterbia. The ceramic thermal barrier coating was deposited to a thickness of 134 microns. The thermal conductivity of the ceramic thermal barrier coating was measured during a heating and a cooling cycle to 1200° C. and had a thermal conductivity of 1.44 W/mK during heating and 1.50 W/mK during cooling. The ceramic thermal barrier coating has a cubic structure.

EXAMPLE 4

A conventional ceramic thermal barrier coating comprising zirconia 8 wt % yttria was deposited onto the MCrAlY bond coating. The ceramic thermal barrier coating was deposited to a thickness of 100 microns, 103 microns and 313 microns respectively for comparison with Examples 1 to 3. The thermal conductivity of the ceramic thermal barrier coatings was measured during a heating cycle to 1200° C. and they had thermal conductivities of 1.31 W/mK, 1.01 W/mK and 1.63 W/mK respectively. The conventional ceramic thermal barrier coating has a tetragonal structure.

It can be seen from Examples 1 to 4 that the measured thermal conductivity changes with the thickness of the ceramic thermal barrier coating, irrespective of the composition of the ceramic thermal barrier coating.

We have found that in these examples for pure electron beam physical vapour deposited ceramic thermal barrier coatings there is a change in the morphology from confused growth microstructure to columnar microstructure at thicknesses around 100 microns. For thicknesses of ceramic thermal barrier coating less than about 100 microns the addition of the second oxide to the ceramic thermal barrier coating does not significantly effect the thermal conductivity. However for ceramic thermal barrier coatings thicker than about 100 microns the addition of erbia or ytterbia clearly reduces the thermal conductivity. The measured thermal conductivity for the ceramic thermal barrier coating in Example 1 is 1.56 W/mK and this is 0.38 W/mK less than the predicted thermal conductivity of 1.94 W/mK for zirconia 8 wt % yttria of 540 microns thickness. Such a difference represents a 20% reduction in thermal conductivity, by doping zirconia 8 wt % yttria with 23 wt % erbia or 8.4 mol % erbia this is equivalent to 19.8 wt % erbium or 6.0 at % erbium.

The theory of thermal conductivity in crystalline solids is determined by the heat that is transferred by electrons, lattice vibrations and radiation. As zirconia and its alloys are electronic insulators, electrons play no part in the total thermal conductivity of a zirconia thermal barrier coating. The contribution to thermal conductivity from lattice vibrations may also be described as phonon conductivity as the quanta of lattice vibrations are known as phonons. The contribution to thermal conductivity from radiation may also be described as photon conductivity as the quanta of radiation are known as photons.

It is believed that the addition of the erbium or ytterbium, in the form of erbia or ytterbia, to the yttria stabilized zirconia distorts the zirconia lattice, introducing microstrain fields and providing a distribution of ions that have ionic radii greater than, i.e. different to, the ionic radius of the zirconium ion, and which act as scattering centers for phonons, and thus reduce phonon thermal conductivity. Other suitable metallic elements which form oxides and which have ions that have ionic radii greater than, different to, the ionic radius of the zirconium ion, may be used, for example dysprosium (Dy), europium (Eu), gadolinium (Gd), neodymium (Nd), praseodymium (Pr) and uranium (U) may be added to the yttria stabilized zirconia to reduce phonon thermal conductivity, these metallic elements are added in the form of oxides. In the case of uranium the uranium would be a non radioactive isotope. Obviously other stabilizing oxides may be used, and the appropriate second oxide addition may be used.

It is believed that the addition of erbia to the yttria stabilized zirconia also reduces the photon thermal conductivity. The erbia absorbs energy in the 0.3 to 5.0 microns waveband and this reduces the photon thermal conductivity because erbia is red. Other oxides which absorb energy in the 0.3 to 5.0 microns waveband may be used to reduce photon thermal conductivity, for example neodymia because neodymia is brown/yellow.

Erbia and neodymia are ideals addition to yttria stabilized zirconia to reduce the thermal conductivity of the ceramic thermal barrier coating because they reduce the phonon thermal conductivity because the erbium ion and neodymium ion have an ionic radius greater than, different to, the ionic radius of the zirconium ion, and they reduce the photon thermal conductivity because erbia and neodymia absorb energy in the 0.3 to 5.0 microns waveband.

It is possible to add a third oxide to the ceramic thermal barrier coating which comprises yttria, zirconia and a second oxide to reduce the thermal conductivity. The third oxide is selected to absorb energy in the 0.3 to 5.0 microns waveband, this reduces the photon thermal conductivity. At an operating temperature of 1500° C., the peak intensity occurs at 0.9 microns wavelength. The third oxide preferably has a dark color, for example nickel oxide is green, cobalt oxide is blue/black and chromia is blue/black. Other third oxides which absorb energy in the 0.3 to 5.0 microns waveband may be used to reduce photon thermal conductivity.

The addition of the second oxide in the examples shown distributes the second oxide substantially evenly throughout the lattice structure of the ceramic thermal barrier coating.

The invention is applicable to zirconia stabilized with other suitable oxides, such as magnesia, calcia, scandia or india.

If ytterbia is used as the first oxide for stabilizing the zirconia, then ytterbia is not used as the second oxide.

The invention is applicable to ceramic thermal barrier coatings applied by vapour deposition, for example chemical vapour deposition and physical vapour deposition, and to ceramic thermal barrier coatings applied by plasma spraying. The preferred method of depositing the ceramic thermal barrier coating is electron beam physical vapour deposition. The ceramic thermal barrier coating may be deposited by combustion chemical vapour deposition.

If the ceramic thermal barrier coating is applied by physical vapour deposition, it may additionally be applied by alternate deposition of layers by plasma assisted physical vapour deposition and by physical vapour deposition to modulate the structure of columnar grains to produce layers with different structure to reduce the thermal conductivity of the ceramic thermal barrier coating. It may be possible to produce these layers by changes in the amount of plasma assistance, or bias, rather than by switching between no plasma assistance and plasma assistance.

Any suitable amount of the second oxide may be used, for example it may be possible to use more than 25 wt % and less than 5 wt % and still obtain a reduction in thermal conductivity of the ceramic thermal barrier coating. However it is preferred to use sufficient second oxide so that more than 2 at % and less than 30 at % of the zirconium ions are replaced by the metallic ion of the second metallic oxide, because for additions above about 30 at % of the metallic ion of the second metallic oxide the rate of decrease in thermal conductivity progressively decreases. Preferably more than 4 at % and less than 25 at % of the zirconium ions are replaced by the metallic ion of the second metallic oxide, more preferably more than 8 at % and less than 20 at % of the zirconium ions are replaced by the metallic ion of the second metallic oxide. Note that 2 at % of the metallic ion of the second metallic oxide is equivalent to about 6–7 wt % of the second metallic oxide, 4 at % of the metallic ion of the second metallic oxide is equivalent to about 16–17 wt % of the second metallic oxide, 8 at % of the metallic ion of the second metallic oxide is equivalent to about 32 wt % of the second metallic oxide, 20 at % of the metallic ion of the second metallic oxide is equivalent to about 64 wt % of the second metallic oxide.

It is preferred to select second metallic oxides, or third metallic oxides, which prevent or do not aid the sintering of the ceramic thermal barrier coating. Thus it is preferred that the second metallic oxide, or third metallic oxide, prevents sintering of the ceramic thermal barrier coating because the sintering of the ceramic thermal barrier coating causes all the small voids, or pores, in the ceramic thermal barrier coating to be consolidated together to form a few larger voids or pores. It is believed that erbia, gadolinia, neodymia and ytterbia do not aid sintering or prevent sintering.

It is to be noted that the second metallic ion of the second metallic oxide has an ionic radius different to the zirconium ion. Preferably the second metallic ion has an ionic radius greater than the ionic radius of the zirconium ion. The difference in ionic radius between the zirconium ion and the second metallic ion distorts the zirconia lattice structure and hence reduces phonon thermal conductivity. It is also preferred that the atomic mass of the second metallic ion is larger than that of the zirconium ion so that the second metallic ions act as scattering centers for phonons to reduce the phonon thermal conductivity.

The use of the second metallic oxide or third metallic oxide which absorbs energy in the 0.3 microns to 5 microns waveband reduces the photon thermal conductivity, this is of major importance for metallic articles which operate at high temperatures such as gas turbine engine turbine blades, turbine vanes and combustion chambers.

The addition of the second oxide, which reduces phonon and photon thermal conductivity, enables the thickness of the ceramic thermal barrier coating to be reduced while achieving the same degree of thermal insulation. The addition of the second oxide, which reduces phonon thermal conductivity, and the third oxide, which reduces photon thermal conductivity, enables the thickness of the ceramic thermal barrier coating to be reduced while achieving the same degree of thermal insulation. Alternatively the same thickness of ceramic thermal barrier coating may be retained to achieve a greater degree of thermal insulation.

We claim:

1. A coated metallic article, comprising:
   a bond coating on the metallic articles; and
   a ceramic thermal barrier coating on the bond coating, the ceramic thermal barrier coating comprising zirconia, a first metallic oxide to stabilize the zirconia and a second metallic oxide to reduce the thermal conductivity of the ceramic thermal barrier coating, the second metallic oxide being distributed substantially evenly throughout the ceramic thermal barrier coating the metallic ion of the second metallic oxide having an ionic radius different from the ionic radius of the zirconium ion, to reduce phonon thermal conductivity of the ceramic thermal barrier coating, and the second metallic oxide absorbs energy in the 0.3 microns to 5 microns waveband to reduce photon thermal conductivity.

2. A coated metallic article as claimed in claim 1 wherein the ceramic thermal barrier coating comprises 4 to 20 wt % of the first metallic oxide, 5 to 25 wt % of the second metallic oxide and the balance is zirconia plus incidental impurities.

3. A coated metallic article as claimed in claim 1 wherein the ceramic thermal barrier coating comprises 2 to 25 mol % of the second metallic oxide.

4. A coated metallic article as claimed in claim 1 wherein the ceramic thermal barrier coating comprises 2 at % to 25 at % of the metallic ion of the second metallic oxide.

5. A coated metallic article as claimed in claim 1, wherein the second metallic oxide is selected from the group consisting of erbia and neodymia.

6. A coated metallic article as claimed in claim 1 wherein the first metallic oxide is selected from the group consisting of yttria, calcia, magnesia, india, scandia and ytterbia.

7. A coated metallic article as claimed in claim 1 wherein the bond coating comprises a metal oxide layer on the metallic article.

8. A coated metallic article as claimed in claim 1 wherein the bond coating comprises an aluminide, a platinum aluminide, an MCrAlY alloy or other aluminum containing alloy coating on the metallic article and a metallic oxide layer on the bond coating.

9. A coated metallic article as claimed in claim 1 wherein the bond coating comprises an aluminum containing alloy coating on the metallic article, a platinum enriched aluminum containing alloy layer on the aluminum containing alloy coating, a platinum aluminide coating on the platinum enriched aluminum containing alloy layer and an alumina layer on the platinum aluminide coating.

10. A coated metallic article as claimed in claim 1 wherein the bond coating comprises a platinum enriched outer layer on the metallic article and a metallic oxide layer on the platinum enriched outer layer.

11. A coated metallic article as claimed in claim 1 wherein the metallic article comprises a nickel superalloy or a cobalt superalloy.

12. A coated metallic article as claimed in claim 1 wherein the ceramic thermal barrier coating has columnar grains.

13. A coated metallic article as claimed in claim 12 wherein the columnar grains include alternate layers with different structure to reduce thermal conductivity.

14. A coated metallic article as claimed in claim 1 wherein the ceramic thermal barrier coating is at least 100 microns thick.

15. A coated metallic article, comprising:
a bond coating on the metallic article; and
a ceramic thermal barrier coating on the bond coating, the ceramic thermal barrier coating comprising zirconia, a first metallic oxide to stabilize the zirconia, a second metallic oxide and a third metallic oxide to reduce the thermal conductivity of the ceramic thermal barrier coating, the second metallic oxide and third metallic oxide being distributed substantially evenly throughout the ceramic thermal barrier coating, the metallic ion of the second metallic oxide having an ionic radius different from the ionic radius of the zirconium ion to reduce phonon thermal conductivity of the ceramic thermal barrier coating, and the third metallic oxide absorbs energy in the 0.3 microns to 5 microns waveband to reduce photon thermal conductivity.

16. A coated metallic article as claimed in claim 15 wherein the ceramic thermal barrier coating comprises 4 to 20 wt % of the first metallic oxide, 5 to 25 wt of the second metallic oxide and the balance is zirconia plus incidental impurities.

17. A coated metallic article as claimed in claim 15 wherein the ceramic thermal barrier coating comprises 2 to 25 mol % of the second metallic oxide.

18. A coated metallic article as claimed in claim 15 wherein the ceramic thermal barrier coating comprises 2 at % to 25 at % of the metallic ion of the second metallic oxide.

19. A coated metallic article as claimed in claim 15 wherein the second metallic oxide is selected from the group consisting of dysprosia, erbia, europia, gadolinia, neodymia, praseodymia, urania and ytterbia.

20. A coated metallic article as claimed in claim 15 wherein the first metallic oxide is selected from the group consisting of yttria, calcia, magnesia, india, scandia and ytterbia.

21. A coated metallic article as claimed in claim 15 wherein the bond coating comprises a metal oxide layer on the metallic article.

22. A coated metallic article as claimed in claim 15 wherein the bond coating comprises an aluminide, a platinum aluminide, an MCrAly alloy or other aluminum containing alloy coating on the metallic article and a metallic oxide layer on the bond coating.

23. A coated metallic article as claimed in claim 15 wherein the bond coating comprises an aluminum containing alloy coating on the metallic article, a platinum enriched aluminum containing alloy layer on the aluminum containing alloy coating, a platinum aluminide coating on the platinum enriched aluminum alloy layer and an alumina layer on the platinum coating.

24. A coated metallic article as claimed in claim 15 wherein the bond coating comprises a platinum enriched outer layer on the metallic article and a metallic oxide layer on the platinum enriched outer layer on the metallic article.

25. A coated metallic article as claimed in claim 15 wherein the metallic article comprises a nickel superalloy or a cobalt superalloy.

26. A coated metallic article as claimed in claim 15 wherein the ceramic thermal barrier coating has columnar grains.

27. A coated metallic article as claimed in claim 26 wherein the columnar grains include alternate layers with different structure to reduce thermal conductivity.

28. A coated metallic articled as claimed in claim 15 wherein the ceramic thermal barrier coating is at least 100 microns thick.

29. A coated metallic article as claimed in claim 15 wherein the third metallic oxide is selected from the group consisting of nickel oxide, cobalt oxide and chromium oxide.

30. A method of applying a thermal barrier coating on a metallic article, comprising the steps of:
forming a bond coating on the metallic article; and
applying a ceramic thermal barrier coating to the bond coating, the ceramic thermal barrier coating comprising zirconia, a first metallic oxide to stabilize the zirconia and a second metallic oxide to reduce the thermal conductivity of the ceramic thermal barrier coating, the second metallic oxide being distributed substantially evenly throughout the ceramic thermal barrier coating, the metallic ion of the second metallic oxide having an ionic radius different from the ionic radius of the zirconium ion to reduce phonon thermal conductivity of the ceramic thermal barrier coating, and the second metallic oxide absorbs energy in the 0.3 microns to 5 microns waveband to reduce photon thermal conductivity.

31. A method as claimed in claim 30 comprising applying a ceramic thermal barrier coating which comprises 4 to 20 wt % of the first metallic oxide, 5 to 25 wt % of the second metallic oxide and the balance is zirconia plus incidental impurities.

32. A method as claimed in claim 30 comprising applying a ceramic thermal barrier coating which comprises 2 to 25 mol % of the second metallic oxide.

33. A metallic article as claimed in claim 30 wherein the ceramic thermal barrier coating comprises 2 at % to 25 at % of the metallic ion of the second metallic oxide.

34. A method as claimed in claim 30 wherein the second metallic oxide is selected from the group consisting of erbia and neodymia.

35. A method as claimed in claim 30 wherein the first metallic oxide is selected from the group consisting of yttria, calcia, magnesia, india, scandia and ytterbia.

36. A method as claimed in claim 30 wherein the metallic article comprises a nickel superalloy or a cobalt superalloy.

37. A method as claimed in claim 30 comprising applying the ceramic thermal barrier coating by vapour deposition to produce columnar grains in the ceramic thermal barrier coating.

38. A method as claimed in claim 37 comprising applying the ceramic thermal barrier coating by physical vapour deposition.

39. A method as claimed in claim 37 comprising applying the ceramic thermal barrier coating by alternate plasma assisted vapour deposition and vapour deposition.

40. A method as claimed in claim 30 comprising applying the ceramic thermal barrier coating to a thickness of at least 100 microns.

41. A method of applying a thermal barrier coating on a metallic article, comprising the steps of:

forming a bond coating on the metallic article; and applying a ceramic thermal barrier coating to the bond coating, the ceramic thermal barrier coating comprising zirconia, a second metallic oxide and a third metallic oxide to reduce the thermal conductivity of the ceramic thermal barrier coating, the second metallic oxide and third metallic oxide being distributed substantially evenly throughout the ceramic thermal barrier coating, the metallic ion of the second metallic oxide having an ionic radius different from the ionic radius of the zirconium ion to reduce phonon thermal conductivity of the ceramic thermal barrier coatings and the third metallic oxide absorbs energy in the 0.3 microns to 5 microns waveband to reduce photon thermal conductivity.

42. A method as claimed in claim 41 comprising applying a ceramic thermal barrier coating which comprises 4 to 20 wt % of the first metallic oxide, 5 to 25 wt % of the second metallic oxide and the balance is zirconia plus incidental impurities.

43. A method as claimed in claim 41 comprising applying a ceramic thermal barrier coating which comprises 2 to 25 mol % of the second metallic oxide.

44. A metallic article as claimed in claim 41 wherein the ceramic thermal barrier coating which comprises 2 at % to 25 at % of the metallic ion of the second metallic oxide.

45. A method as claimed in claim 41 wherein the second metallic oxide is selected from the group consisting of dysprosia, erbia, europia, gadolinia, neodymia, praseodymia, urania and ytterbia.

46. A method as claimed in claim 41 wherein the first metallic oxide is selected from the group consisting of yttria, calcia, magnesia, india, scandia and ytterbia.

47. A method as claimed in claim 42 wherein the third metallic oxide is selected from the group consisting of nickel oxide, cobalt oxide and chromium oxide.

48. A method as claimed in claim 41 wherein the ceramic thermal barrier coating has a thickness of greater than 100 microns.

49. A method as claimed in claim 30 wherein the ceramic thermal barrier coating has a thickness of greater than 100 microns.

50. A coated metallic article as claimed in claim 15 wherein the ceramic thermal barrier coating has a thickness of greater than 100 microns.

51. A coated metallic article as claimed in claim 1 wherein the ceramic thermal barrier coating has a thickness of greater than 100 microns.

* * * * *